June 14, 1927.  W. C. HEYDECKER, JR  1,632,406
PRESSURE REGULATING VALVE
Filed June 22, 1926  2 Sheets-Sheet 1
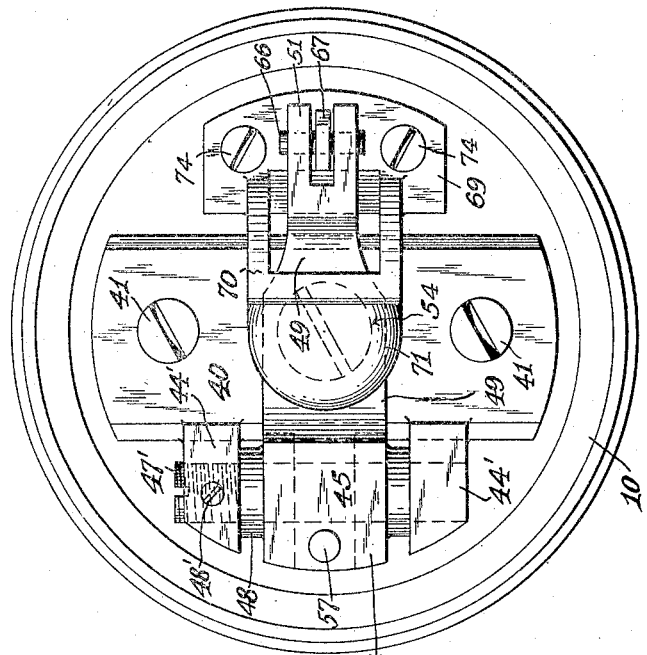
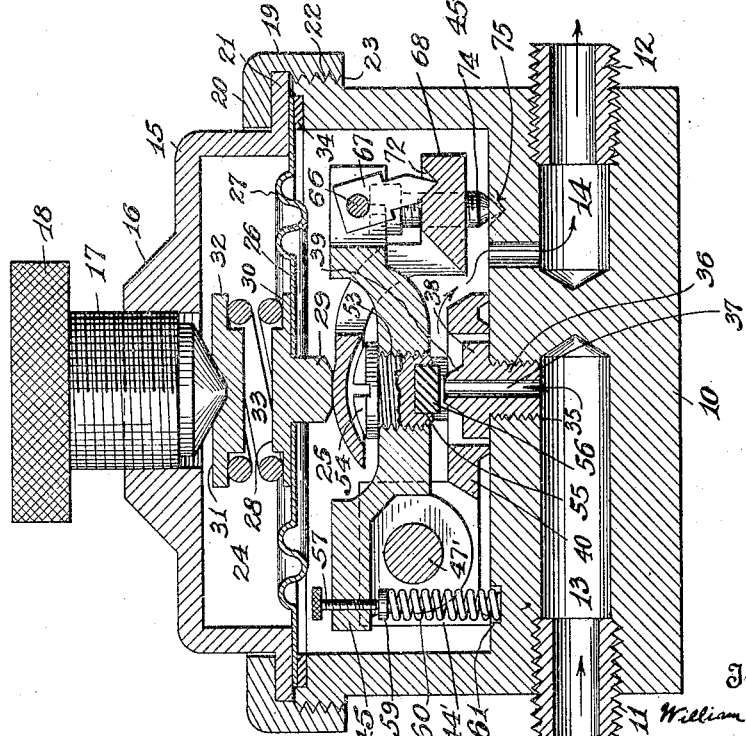
Inventor
William C. Heydecker, Jr.
By his Attorney
Edward L. Higgins June 14, 1927.  W. C. HEYDECKER, JR  1,632,406
PRESSURE REGULATING VALVE
Filed June 22, 1926   2 Sheets-Sheet 2
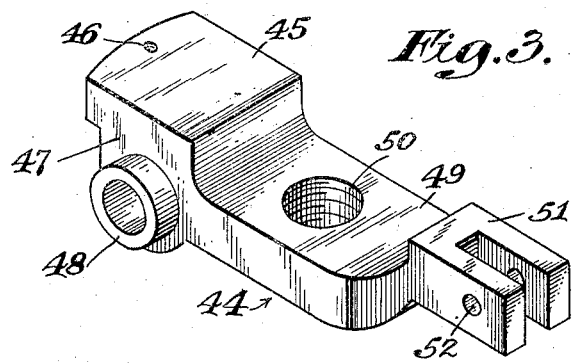
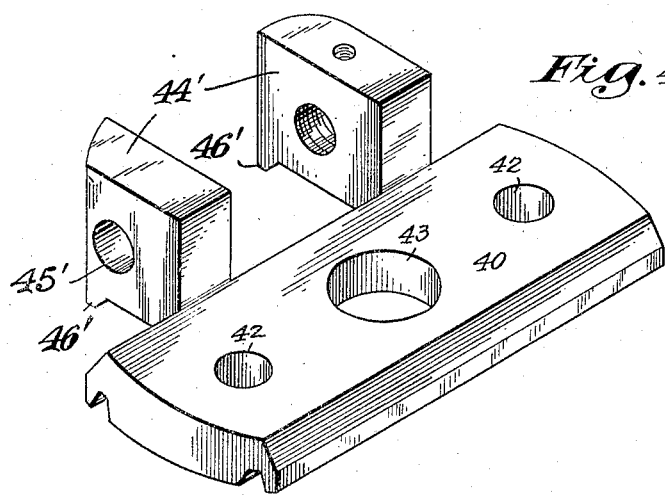
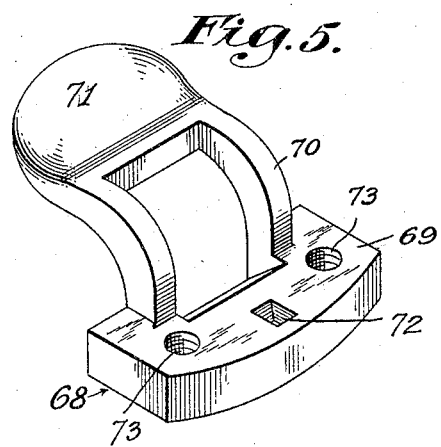
Inventor
William C. Heydecker, Jr.
By his Attorney
Edward S. Higgins Patented June 14, 1927.

1,632,406

UNITED STATES PATENT OFFICE.

WILLIAM C. HEYDECKER, JR., OF NEW YORK, N. Y.

PRESSURE-REGULATING VALVE.

Application filed June 22, 1926. Serial No. 117,712.

This invention relates broadly to valves for regulating pressure but more particularly to valves for reducing and controlling the pressure of the flow of oxygen from oxygen tanks. In the medical profession, oxygen is now given by injecting it into the skin of the patient and it becomes of the utmost importance that the pressure be reduced to a minimum and always be under control.

It is a primary object of my present invention to provide a very simple and compact valve construction which is positive and reliable in its functional operation and capable of very fine adjustment.

It is also an object of my present invention to provide a novel pressure regulating valve so constructed and arranged as to allow for the ready examination, removal and replacement of the parts thereof without removing the valve from the pipe line or dismantling the same to any extent.

Other objects and advantages of my present invention will be apparent from the description to follow taken in connection with the accompanying drawings wherein—

Figure 1 is an enlarged vertical sectional view of a casing embodying my present invention, certain of the parts being shown in elevation.

Figure 2 is an enlarged top plan view with the cover removed.

Figures 3, 4 and 5 are detail perspective views of the several operative parts of the valve mechanism in detached position.

Referring to the drawings in detail, a cylindrical casing 10 formed of brass or other suitable metal is provided with an inlet pipe 11 leading from a suitable source of supply (not shown) of oxygen and an outlet pipe 12 leading to an apparatus (not shown) used by the operator for injecting the oxygen. The flow of oxygen in the pipe 11 is usually of great pressure and it is the purpose of the present invention to regulate such flow so that upon leaving the pipe 12, said pressure will be greatly reduced and under positive control. As will be seen from Figure 1, the inlet pipe 11 leads to an aligned passageway 13 extending to substantially the center of the casing and the outlet pipe 12 communicates with an aligned passageway 14, said passageways 13 and 14 being substantially of the same diameter as the pipes 11 and 12, respectively.

The upper end of the casing 10 is closed by a suitable brass cover 15 formed with an enlargement or upstanding internally screw threaded boss 16 to receive the external screw threaded portion of the screw 17, said screw 17 being provided with a hand wheel or knurled knob 18 for convenience in turning the same. Said cover 15 is secured to the body of the tank 10 by means of a ring 19 formed with an inwardly extending flange 20 which is adapted to engage an outwardly extending flange 21 formed on the cover 15 when the ring 19 is screwed down so that the internal screw threads 22 on the ring 19 engage the external screw threads 23 on the tank.

Dividing the casing 10 into two compartments or chambers, an upper chamber 24 and a lower chamber 25, is a diaphragm 26 formed with a plurality of corrugations 27 for the purpose of giving the necessary flexibility and strength to the same. This diaphragm 26 seals the lower compartment and is provided with a centrally disposed opening which is sealed by a disk 28 formed with a downwardly extending lug 29 and an annular flange 30, the bottom end of said lug 29 being dished out for a purpose which will be explained. Positioned directly above said disk 28 but removed from the same is a centering disk 31 formed with an annular flange 32, the upper surface of said disk 31 being dished out at its center to receive the pointed end of the screw 17 as will be seen from Figure 1.

Between said disks 28 and 31 is disposed a spiral spring 33, the upper terminal of said spring engaging the under surface of the flange 32 of the disk 31, and its lower terminal engaging the upper surface of the flange 30, said spring tending to hold the disks and their associated parts away from each other. The outer edge of the diaphragm 26 rests on a gasket 34 which is seated in a cutout portion of the upper edge of the casing. The spring 33 allows the diaphragm 27 to raise when the pressure in the lower chamber 25 is sufficient and in this manner the valve is allowed to automatically close or partially close thus maintaining a constant unvarying pressure in the outlet 12.

As will be seen from the lower portion of Figure 1, the passageway 13 adjacent its innermost extremity communicates with an internally screw threaded opening 35 which is disposed at right angles to said passageway 13. Into this opening 35 is positioned a screw 36 provided with a restricted opening 37 through its body portion, and formed with a flange portion 38, and an upwardly extending boss portion 39, forming a valve seat. When the screw 36 is in operative position, its flange 38 rests against the floor of the casing as in Figure 1.

Mounted on the floor of the casing 10 is a substantially flat metal plate 40 rectangular in shape. This plate 40 is positioned on the floor in a plane at right angles to the plane of the passageways 13 and 14 and is secured to said floor by means of screws 41 passing through holes 42 formed in the plate, and aligned holes (not shown) formed in the floor of the casing. In the center of said plate 40 is formed an opening 43 wherein the flange portion 38 of the screw 36 is disposed when the said screw is in operative position as shown in Figure 1. It will be noted that the diameter of this opening 43 is slightly larger than the diameter of said flange portion 38 in order to permit of the ready insertion and withdrawal of said screw 36.

Formed integrally with said plate 40 on either side of the opening 43 thereof is a bearing block 44′, each of said blocks 44′ having an opening 45′ therein, the opening 45′ in one of said blocks 44′ being internally screw threaded, the said blocks resting on lugs 46′.

Passing through the openings 45′ in the bearing blocks 44′ is a shaft 47′, one end of said shaft 47′ being screw threaded and adapted to engage the internal screw threads in the block 44′ provided therewith. Positioned in the block 44′ provided with the internal screw threads and adapted to engage the opening in the screw threaded end of the shaft 47′ is a screw 48′. This screw 48′ prevents relative movement between the blocks 44′ and the shaft 47′. It will be noted that the projecting end of said shaft 47′ is slotted for the ready turning of said shaft by means of a suitable tool.

Referring more particularly to Figure 3, a rocker member 44 there illustrated, is mounted on the shaft 47′ carried by the blocks 44′ and is positioned between said blocks 44′, said member 44 being disposed in a plane at right angles to the plane of the plate 40. This rocker member 44 comprises a flat portion 45 formed with a screw threaded opening 46 and integral ear portions 47 depending from said flat portion 45, said ear portions 47 being provided with bosses 48 formed with openings therethrough to accommodate shaft 47′. Formed integrally with said flat portion 45 is a recessed portion 49 having a centrally disposed screw threaded opening 50; and formed integrally with said recessed portion 49 is a reduced bifurcated portion 51, said bifurcated portion 51 being provided with aligned openings 52.

Referring again to Figure 1, positioned in the opening 50 of the recessed portion 49 is a screw 53 with a curved top 54 centrally slotted for the reception of a tool of any desired type. Formed in the lower end of the body of said screw 53 is a dished out or recessed portion 55 and mounted in said recess 55 is a rubber plug 56, which is adapted to impinge and press against the seat provided by the upper flat surface of the upstanding boss 39 of the screw 36 to close the opening 37 thereby preventing oxygen from passing through.

In the opening 46 of the flat portion 45 of the rocker member 44 is mounted a screw 57 having a knob 58 and carrying a disk 59 at its lower end. Mounted on one side of the shaft 47′ and positioned between said centering disk 59 and the floor of the tank is a coiled compression spring 60, one terminal thereof engaging the disk 59 and the other being seated in a recess 61 formed in the floor of the tank. This spring 60 normally tends to push the flat portion 45 of the rocker member 44 upwardly and the recessed portion 49 downwardly carrying the screw 53 along and pressing the rubber plug 56 against its seat on top of the screw 36 to close the opening 37 in said screw 36.

Positioned in the openings 52 of the bifurcated portion 51 is a pin 66 and loosely mounted on said pin 66 is an arm 67 formed with a knife edge.

Also mounted on the floor of the tank 10 in the same plane as the rocker member 34 is a lever member 68 (Figure 5). This lever member 68 comprises a base portion 69, and a pair of upwardly and outwardly curved arms 70 formed integrally therewith, the said arms 70 terminating in an integrally formed head 71, concavo-convex in shape. Formed in the center of said base 69 is a small groove 72 and adjacent each end of said base 69 is a screw threaded opening 73. Mounted in each of said openings 73 when the lever is in operative position is a screw 74 provided with a pointed end. This pointed end of the screw 74 is adapted to fit in a groove 75 machined in the floor of the tank 10, said groove 75 being slightly larger than the pointed end of the screw 74 to permit a little play between the said pointed end and the sides of the said groove 75.

As will be seen from Figure 1, when the rocker member 44 and the lever member 68 are in operative position, the bifurcated portion 51 of the rocker member 44 is positioned in the opening formed between the arms 70 of the lever member 68, thus locating said bifurcated portion 51 directly above the base portion 69 of the lever 68 so that the arm 67 carried by the pin 66 is positioned directly above the groove 72 thereby permitting the pointed end of said arm 67 to engage in said groove 72. It will also be noted that the head 71 of said lever member 68 extends above the recessed portion 49 of the rocker member 44 and is disposed directly above the top 54 of the screw 53 and because of the shape of said head 71 it is adapted to snugly engage the said top 54. When the lever 68 is in this position, the lower end of the extension 29 of the disk 28 engages the upper surface of said head 71.

In operation, oxygen is admitted to the inlet 11 from any source of supply and the outlet 12 is in communication with any desire apparatus through which it is desired to supply oxygen. By reason of the upward urge of the spring 62 against the flat portion 45 of the rocker member 44, the plug 56 carried by the screw 53 is normally pressed against the valve seat on top of the screw 36 thereby closing the opening 37 in said screw 36 and preventing any flow of oxygen. To remove this plug 56 from its seat and thus permit the flow of oxygen through the opening 37, the screw 17 is set upon which tends to compress the spring 33 and force the disk 28 downwardly against the head 71 of the lever 68. This downward thrust against the head 71 rocks the member 68 around its fulcrum represented by the point of the screw 74 thereby raising the base 69, which, by reason of the arm 67, carries the bifurcated portion 51 and the recessed portion 49 upwardly thereby raising the plug 56 off its seat on top of the screw 36. It will be obvious that by reason of the arrangement of the parts and the fulcrum action of the parts a very fine adjustment is afforded.

When the chamber 25 is full of oxygen, the pressure therein raises the diaphragm 27 with its disk 29 thereby relieving the downward pressure on the head 71 permitting the base 69 to be lowered which results in the lowering of the rocker member 44 with its plug. As the pressure in the said chamber 25 recedes by reason of the supply in the supply tank becoming diminished, the screw 33 forces the diaphragm 27 downwardly so that pressure is exerted on the head 71 forcing it downwardly and the member 44 upwardly with its plug 56, thus automatically keeping the flow constant.

It will now be apparent that I have devised a novel and useful pressure regulating valve embodying many advantageous features and while I have, in the present instance, shown and described only the preferred embodiment of my invention which will be found in practice to give satisfactory and reliable results, it is to be understood that the embodiment described is susceptible of modification in various particulars without departing from the spirit or scope of the invention or sacrificing any of its advantages.

I claim:

1. A pressure regulating valve comprising a casing formed with a communicating inlet and outlet, a rocker member positioned in alignment with said communication, a screw valve carried by said rocker member at its center, a lever mounted in alignment with said rocker member, the free end of said lever being positioned directly above and in alignment with said screw valve, and a screw operatively connected to said lever and mounted directly above and in alignment with said lever, rocker member and screw valve whereby said screw valve is positively operated.

2. In a pressure regulating valve, a casing having communicating inlet and outlet openings, a valve seat positioned between said openings, a bearing block mounted on either side of said valve seat, a shaft mounted in said blocks, a rocker member mounted on said shaft in alignment with said valve seat, said rocker member comprising a flat portion, a recessed portion formed integrally therewith, said recessed portion having an opening therein and a bifurcated portion formed integrally with said recessed portion, a screw mounted in the opening in said recessed portion and in alignment with said valve seat, a rubber plug mounted in the end of said screw, said plug being adapted to engage the said seat and a coiled spring mounted between the flat portion of said rocker member and the floor of the casing and normally urging said flat portion upwardly and rubber plug downwardly on its seat, and a lever operatively connected to said rocker member to rock the same on its shaft, and a screw operatively connected to said lever to actuate said lever.

3. A pressure regulating valve comprising a casing formed with an inlet and outlet, a valve seat positioned between said inlet and outlet, a bearing block mounted on either side of said valve seat, a shaft carried by said blocks, a rocker member mounted on said shaft, said rocker member comprising a flat portion, a recessed portion and a bifurcated end portion, a coiled spring positioned on one side of said shaft and adapted to engage the flat portion of said rocker member to rock the same on its shaft, a screw valve carried by the recessed portion of said rocker member adapted to engage said valve seat, a lever operatively connected to the bifurcated end portion of said rocker member and a screw operatively connected to said lever to actuate the same.

4. A pressure regulating valve comprising a casing having an inlet and an outlet, a valve seat positioned between said inlet and outlet, a bearing block mounted on either side of said valve seat, a shaft mounted on said blocks, a rocker member mounted adjacent one of its ends on said shaft, said rocker member consisting of a flat portion, a recessed portion having a centrally disposed opening and a bifurcated end portion, a pointed arm mounted loosely on said bifurcated end portion, a screw mounted in the opening in said recessed portion, said screw formed with a recess in its end, a rubber plug mounted in said last named recess and positioned in alignment with said valve seat, a coiled spring engaging said rocker member at a point outside said shaft adapted to rock said rocker member on said shaft whereby said rubber plug engages said valve seat, a lever member adapted to move said rocker member away from the valve seat, said lever member consisting of a base mounted on pointed screws loosely mounted in the casing, a pair of upwardly and outwardly curved arms formed integrally with said base and a head formed integrally with said arms, said rocker member and said lever member being so positioned relatively that the head of said lever member is positioned above and engages the recessed portion of said rocker member and the base of the lever is positioned underneath the bifurcated end portion of said rocker member whereby movement of the lever member is imparted to the rocker member, and a regulating screw operatively connected to the head of said lever member whereby said lever member is actuated.

In testimony whereof I have hereunto affixed my signature.

WILLIAM C. HEYDECKER, Jr.